(12) United States Patent
Judd

(10) Patent No.: US 7,606,673 B2
(45) Date of Patent: Oct. 20, 2009

(54) ROTATING BEARING ANALYSIS AND MONITORING SYSTEM

(75) Inventor: John E. Judd, Hamden, CT (US)

(73) Assignee: Dynamic Measurement Consultants, LLC, Hamden, CT (US)

( * ) Notice: Subject to any disclaimer, the term of this patent is extended or adjusted under 35 U.S.C. 154(b) by 0 days.

(21) Appl. No.: 12/297,368

(22) PCT Filed: Apr. 30, 2007

(86) PCT No.: PCT/US2007/010505

§ 371 (c)(1), (2), (4) Date: Oct. 16, 2008

(87) PCT Pub. No.: WO2007/130380

PCT Pub. Date: Nov. 15, 2007

(65) Prior Publication Data

US 2009/0093975 A1   Apr. 9, 2009

Related U.S. Application Data

(60) Provisional application No. 60/796,992, filed on May 1, 2006.

(51) Int. Cl.
*G01F 17/00* (2006.01)
(52) U.S. Cl. ............................................ 702/56
(58) Field of Classification Search .......... 702/34, 702/41, 56, 61, 81, 94, 145, 177, 181, 182, 702/183
See application file for complete search history.

(56) References Cited

U.S. PATENT DOCUMENTS 3,705,516 A   12/1972   Reis
3,758,758 A   9/1973    Garnes et al.
3,793,627 A   2/1974    Darrel et al.
4,010,637 A   3/1977    Harwell et al.
4,295,136 A   10/1981   Stoutenburg
4,437,163 A   3/1984    Kurihara et al.
4,478,082 A   10/1984   Sato et al.
4,488,240 A   12/1984   Kapadia et al.
4,493,042 A   1/1985    Shima et al.
4,528,852 A   7/1985    Sohoel
4,615,216 A   10/1986   Vykoupil
4,729,239 A   3/1988    Gordon
4,989,159 A   1/1991    Liszka et al.

(Continued)

*Primary Examiner*—Drew A Dunn
*Assistant Examiner*—Stephen J Cherry
(74) *Attorney, Agent, or Firm*—DeLio & Peterson, LLC; Anthony P. DeLio

(57) ABSTRACT

A method of analyzing vibrations of a rolling element bearing installed in a rotating machine includes accessing vibration data corresponding to the bearing to be analyzed, determining a degraded condition factor BD for the bearing, selecting an expected designer-determined mean-time-to-failure MTTF of the bearing operating under a design load in the operating environment of the rotating machine, selecting a forecast time period, calculating a reduced mean-time-to-failure RMTTF of the bearing using the expected designer-determined mean-time-to-failure MTTF and the degraded condition factor BD, calculating a probability of failure of the bearing in the forecast time period using the reduced mean-time-to-failure RMTTF, accessing cost data corresponding to a cost of failure of the bearing in the rotating machine, calculating a financial risk from the calculated probability of failure in the forecast time period and the cost data, and displaying the financial risk for the selected time period.

26 Claims, 8 Drawing Sheets

U.S. PATENT DOCUMENTS

| | | |
|---|---|---|
| 5,115,671 A | 5/1992 | Hicho |
| 5,266,929 A | 11/1993 | Carmichael et al. |
| 5,298,889 A | 3/1994 | Diei et al. |
| 5,319,357 A | 6/1994 | Diei et al. |
| 5,336,996 A | 8/1994 | Rusnak |
| 5,453,130 A | 9/1995 | Maddox |
| 5,477,730 A | 12/1995 | Carter |
| 5,679,900 A | 10/1997 | Smulders |
| 5,744,722 A | 4/1998 | Wu et al. |
| 5,847,658 A | 12/1998 | Irie et al. |
| 5,852,793 A | 12/1998 | Board et al. |
| 5,963,884 A | 10/1999 | Billington et al. |
| 6,145,381 A | 11/2000 | Mathisen et al. |
| 6,257,066 B1 | 7/2001 | Chandler et al. |
| 6,370,957 B1 | 4/2002 | Filippenko et al. |
| 6,484,109 B1 | 11/2002 | Lofall |
| 6,763,312 B1 | 7/2004 | Judd |
| 6,922,640 B2 | 7/2005 | Vezzu et al. |
| 6,944,572 B2 | 9/2005 | Ushiku et al. |
| 2002/0107589 A1 | 8/2002 | Grimm |
| 2003/0074159 A1 | 4/2003 | Bechhoefer et al. |
| 2004/0122604 A1 | 6/2004 | Gelsomino |
| 2004/0254764 A1 | 12/2004 | Wetzer et al. |
| 2005/0072239 A1 | 4/2005 | Longsdorf et al. |
| 2005/0096873 A1 | 5/2005 | Klein |
| 2005/0102119 A1 | 5/2005 | Alvarez et al. |
| 2005/0154542 A1 | 7/2005 | Frerichs et al. |
| 2005/0165582 A1 | 7/2005 | Tsung et al. |
| 2005/0171736 A1 | 8/2005 | Kang |
| 2005/0246135 A1 | 11/2005 | Van Harn |

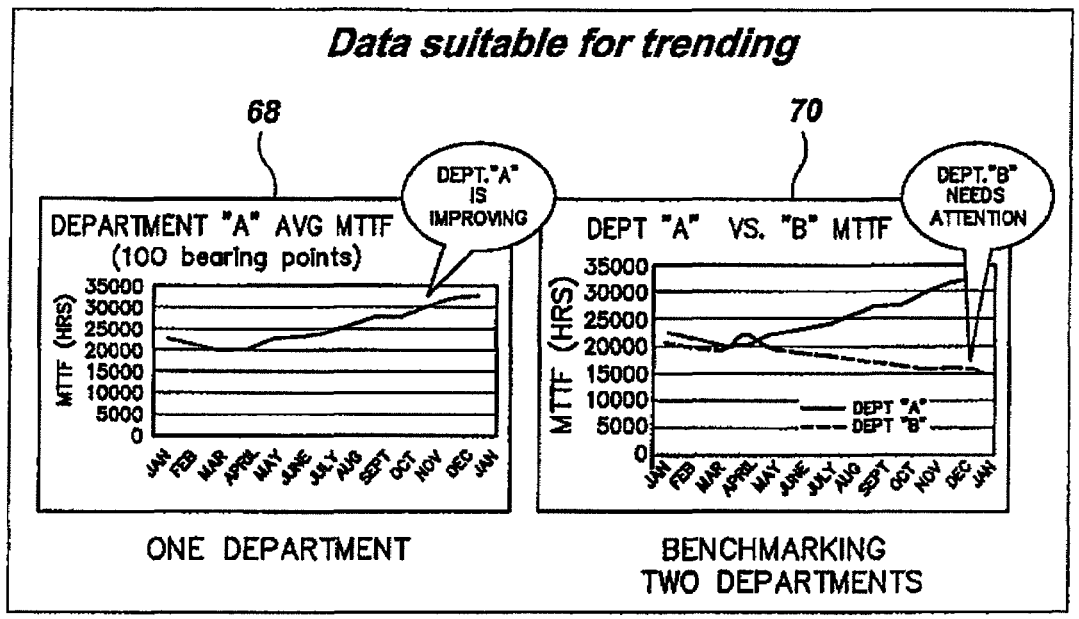

ROTATING BEARING ANALYSIS AND MONITORING SYSTEM

TECHNICAL FIELD

This invention relates to systems for monitoring, detecting, storing and analyzing vibrations produced by, or affecting the life of, rolling element bearings in rotating machinery as an integral part of a Reliability Centered (RCM) or Conditioned Based (CBM) maintenance program. More specifically, this invention relates to computer systems that use discriminant analysis of the bearing impacts and vibrations in order to detect bearing wear, imbalance, misalignment and other failure related aspects of the bearings and combine the analyzed data with cost related aspects of a bearing failure, such as bearing replacement, labor and interruption of production costs, to provide information about the likelihood of bearing failure over time and the financial risk presented by the potential bearing failure.

DESCRIPTION OF RELATED ART

Vibration analysis of rotating machinery is a well-known method of monitoring bearings and estimating bearing life expectancy. Vibration analysis is used to assess bearing condition and detect imminent bearing failure. Analysis methods are based on the principle that rotating machines exhibit distinct operational and defect related vibration patterns.

The vibration patterns occur at rotationally related frequencies and are caused by forces, discontinuities, geometry placement and the physical condition of various machine elements. These vibration patterns change in energy and frequency content as the physical condition of the machine deteriorates. Measuring and interpreting the cause of the change enables those skilled in the art to detect problems early in the degradation process and initiate action to prevent unanticipated machine failure, prevent production shutdown and avert potentially catastrophic failures.

This technology has become the mainstay of modern predictive (PdM) and reliability centered maintenance (RCM) programs throughout the world. Various measurement techniques are hereinafter described, and the determinants derived are hereinafter described and discussed.

In spite of its technical effectiveness, the nature and complexity of vibration data and the process of extracting predictive failure data has added to the cost of its implementation and impeded its widespread commercial use. Highly skilled engineering level specialists, with extensive training, and sophisticated equipment are often required for routine reviews and interpretations of data. More importantly, the data is not quantified and interpretation of its meaning is often very subjective. The loss of one or two highly trained personnel can disrupt or cripple a major maintenance program.

Two of the most common techniques in general use for detection, measurement and analysis of vibrations in rotating machinery are Overall Measurement and Spectral Band Analysis. The overall measurement technique commonly utilizes a piezoelectric crystal accelerometer to convert the mechanical vibration motion to a voltage proportional to the instantaneous acceleration or velocity mode vibration and monitors the root mean square (RMS) value of the broad frequency band displacement, acceleration or velocity signal. When the overall vibration level exceeds a predetermined threshold, a warning is initiated and inspection, repair, or machine shutdown action ensues.

This technique has the advantage of providing a single number, expressed in acceleration g units, in/sec velocity units or mil-inch displacement units, to indicate the machine condition. However, this technique has a weakness in that it often fails to detect subtle high frequency, low level bearing defects. High level energy from shaft imbalance and misalignment often dominates the overall signal causing it to be insensitive to low energy bearing problems. For this reason machinery bearing component failures often occur without warning, because this technique failed to provide adequate warning. The spectral band analysis technique, a more recent and improved technique addresses this shortcoming by employing a spectrum band analysis approach, where the vibration signal of defined bandwidth (upper and lower frequency content) is time sampled and converted into digital form. A Fast-Fourier Transform procedure is performed on the acquired data transforming it from the sampled time domain to the frequency domain in the form of frequency bands of varying amplitude. The level of each band indicates the frequency of the particular forcing function revealing its identity and its severity.

This format allows highly experienced maintenance personnel to directly observe the contributions of each problem source to the overall level at its own characteristic frequency. The individual frequencies, or spectral windows (placed around critical frequency bands) allow highly trained personnel to identify the source of a problem. For example, imbalance occurs at primary rotational frequency, misalignment at two or three times rotational frequency and the level of each component will identify the severity of the condition. Alarm levels are often preset for specific frequency bands. Levels above some predetermined levels indicate degradation. When the bands of interest include several selected narrow fast Fourier transfer bands, this technique is sometimes referred to as spectral windowing or enveloping.

This technique has the advantage of allowing the highly skilled maintenance practitioner (as used herein "practitioner" refers to a person experienced in rotating machine maintenance) to observe both high and low level signals at high and low frequencies to detect both imbalance and bearing signals. This spectrum analysis technique is very effective when used by an experienced maintenance practitioner, but not very effective in the hands of most untrained maintenance personnel.

The spectrum analyzers and other analysis devices required are complex and require highly specialized training. The spectral data generated by such techniques is voluminous and cumbersome to store track and interpret. More importantly, the technology assumes that bearing defects will produce discrete frequencies related to the ball and race geometries, which is not often the case.

Experience has shown that bearing fatigue is often initiated by high stress concentrations occurring in the ball or race element below the race-ball interface and migrate to the surface. Other causes include spalling, brinneling electrical etching et al. The initial indication of degradation and other common faults is short duration shock wave impulses which do not produce clear Fourier harmonics, but rather produce broadband low level harmonic energy that is distributed over a wide number of harmonic sonic and ultrasonic frequencies. This is often difficult to detect and identify by spectral frequency analysis.

Periodic impacts do occur, but are more effectively identified by envelope demodulation techniques that utilize examination of the low frequency repetitive impact rates related to the classic geometric ball spin frequencies. For these reasons, use of spectral analysis or other diagnostic technology has been limited to the use of large organizations, able to maintain highly skilled maintenance teams trained in vibration analysis, or to contract with outside consulting firms.

The nature of the data produced in spectral analysis technique poses technical problems as well. The data ranges in frequency from a few Hz to 30 kHz and signal levels ranging from microvolts to volts. This data presents special problems in terms of analog or digital data transmission and storage. More importantly, the raw data generated is not easily understood and useful to management personnel who are responsible for making use of it to make decisions remedial action when required.

To solve the problems identified above, the invention disclosed in U.S. Pat. No. 6,763,312, issued to John E. Judd, the inventor of the present invention, provided an improved analysis method using multiple discriminant vibration detection, analysis and data integration which reduced the complex vibration analysis process to a few uniquely derived discrete numbers in a predetermined range. These discriminant based numbers convey the useful information required by a non-technical user, or a skilled practitioner, in order to judge the degradation state of a machine bearing.

Although the multiple discriminant-based analysis method described in U.S. Pat. No. 6,763,312 reduces analysis complexity and allows less technical users to determine the degradation state of a machine bearing, there remains a need for a practical system of applying such information and integrating it into the management of large industrial systems.

In the management of large systems having multiple bearings in multiple machines, the cost of an unexpected bearing failure may be very high for some bearings. For example, a bearing that is difficult to replace and would require a production line shutdown may produce a substantial revenue loss from the lost production. Other bearings might be replaced easily at a nominal cost even if failure occurred unexpectedly. The cost of planned bearing replacement during scheduled maintenance may also vary significantly.

Bearings whose failure would have only a nominal effect on production, and whose replacement cost is high, may be run for longer, and with a higher risk of unplanned failure than bearings having a major effect on production that can be replaced at a relatively nominal cost during scheduled maintenance. Thus, it is not the absolute condition of the bearing that the system manager must be concerned with. The likelihood of failure prior to the time of the next scheduled maintenance, and the cost of an unexpected failure versus the cost of scheduled replacement must also be considered when evaluating the course of action to be taken with respect to a bearing showing degraded performance.

There is a need for systems that provide additional technical bearing analysis methods coupled with cost-of-failure information suitable for the management of multiple bearings in large production facilities.

The term "discriminant," as used herein refers to a linear set of variables that classifies events or items for which the variables are measured. The discriminants derived from both time and frequency based vibration and impact analysis may include such events or items as root mean square ("RMS") values for accelerations or dynamic impact forces at different frequencies, peak impact accelerations, linear and exponentially derived ratios or differentials of peaks to RMS values of accelerations, demodulated lower frequency envelopes of high frequency ringing from impact accelerations, or any one of the well accepted bearing analysis technologies, etc. all of which may be weighted or scaled during the analysis to create a discriminant.

DISCLOSURE OF THE INVENTION

The present invention is directed in one aspect to a method of analyzing vibrations of a bearing installed in a rotating machine which includes accessing vibration data corresponding to the bearing to be analyzed, determining a degraded condition factor BD for the bearing, selecting an expected designer-determined mean-time-to-failure MTTF of the bearing operating under a design load in the operating environment of the rotating machine, selecting a forecast time period, calculating a reduced mean-time-to-failure RMTTF of the bearing using the expected designer-determined mean-time-to-failure MTTF and the degraded condition factor BD, calculating a probability of failure of the bearing in the forecast time period using the reduced mean time to failure RMTTF, accessing cost data corresponding to a cost of failure of the bearing in the rotating machine, calculating a financial risk from the calculated probability of failure in the forecast time period and the cost data, and displaying the financial risk for the selected time period.

In another aspect of the invention, the step of determining a degraded condition factor BD for the bearing from the vibration data includes determining a plurality of discriminants from the vibration data and using the plurality of discriminants to calculate the degraded condition factor BD for the bearing.

Preferably, at least one of the plurality of discriminants is selected from a group consisting of a low frequency energy LF discriminant, a high frequency energy HF discriminant, a crest factor CF discriminant, a kurtosis K discriminant, an envelope demodulation ED discriminant and a peak acceleration P discriminant.

In yet another aspect of the invention, the degraded condition factor BD for the bearing varies from a minimum to a maximum and the step of calculating a reduced mean-time-to-failure RMTTF of the bearing using the expected designer-determined mean-time-to-failure MTTF and the degraded condition factor BD comprises setting the RMTTF equal to the expected designer-determined mean-time-to-failure MTTF when the degraded condition factor BD for the bearing is at the minimum and setting the RMTTF equal to the forecast time period when the degraded condition factor BD for the bearing is equal to the maximum.

The reduced mean-time-to-failure RMTTF may linearly vary from the expected designer-determined mean-time-to-failure MTTF to the forecast time period as the degraded condition factor BD for the bearing varies from the minimum to the maximum.

In still another aspect of the invention, the selected forecast time period corresponds to the selected designer-determined mean-time-to-failure MTTF and varying the forecast time period varies the selected designer-determined mean-time-to-failure MTTF.

The step of calculating a probability of failure of the bearing in the forecast time period using the reduced mean-time-to-failure MTTF preferably includes calculating a probability of failure POF within a time period t using a reduced mean-time-to-failure RMTTF according to the Weibull based equation:

$$POF = 1 - (e \text{ raised to the minus } (t/RMTTF) \text{ to the 3/2 power}).$$

The method of the invention may also include determining a dynamic force factor DF from the vibration data and using that factor to calculate RMTTF along with the designer-determined mean-time-to-failure MTTF and BD. In a preferred embodiment, the BD factor is used to calculate RMTTF which allows calculation of a probability of failure according to the equation above, and the DF factor is used to calculate a bearing life expectancy from RMTTF as a percentage reduction from RMTTF when DF is maximum and equal to RMTTF when DF is minimum. The percentage reduction may be user selected.

In another aspect of the invention, the method includes setting a correspondence between the selected forecast time period and the selected designer-determined mean-time-to-failure MTTF such that varying the forecast time period varies the selected designer-determined mean-time-to-failure MTTF.

In another aspect of the invention, the method includes calculating and displaying a probability of failure within a short term time period using RMTTF where the short term time period is less than the forecast time period.

In another aspect of the invention, the method includes allowing the user to modify the acceptable degree of risk by selecting shorter or longer forecast time periods equated to the calculated probability of failure.

In a preferred aspect of the invention, the method further includes the steps of accessing cost data corresponding to a cost of replacing the bearing in the rotating machine, and displaying a comparison between the cost of replacing the bearing and the financial risk for the selected time period. A warning may be generated when the financial risk for the selected time period exceeds the cost of scheduled replacement of the bearing.

In another preferred aspect of the invention, the user may define vibration frequency exclusion data and the degraded condition factor BD for the bearing is determined from vibration data that excludes a range of vibration frequencies specified by the vibration frequency exclusion data. The vibration frequency exclusion data may define vibration frequencies corresponding to a variable frequency drive, or a gear system.

In still another highly preferred aspect of the invention, multiple bearings are analyzed by accessing additional vibration data corresponding to at least one additional bearing to be analyzed, determining a degraded condition factor BD from the additional vibration data for each additional bearing selecting an expected designer-determined mean-time-to-failure MTTF for each additional bearing, selecting a forecast time period for each additional bearing, calculating a reduced mean-time-to-failure RMTTF for each additional bearing using the degraded condition factor BD for each additional bearing, calculating a probability of failure in the forecast time period for each additional bearing using the reduced mean-time-to-failure RMTTF for each additional bearing, searching for bearings having a probability of failure above a specified level, and displaying information about the bearings having a probability of failure above the specified level.

In an alternative aspect of the invention, financial risk may be calculated for each additional bearing and the bearings having financial risk above a specified value are located and displayed. The invention also includes searching for and displaying information about bearings having the highest degradation factor BD and/or the shortest remaining expected life.

The invention is also directed to a computer program product for analyzing vibrations of a bearing installed in a rotating machine including a computer usable medium having computer readable program code means embodied in said medium for accessing vibration data corresponding to the bearing to be analyzed, computer readable program code means for determining a degraded condition factor BD for the bearing from the vibration data, computer readable program code means for selecting an expected designer-determined mean-time-to-failure MTTF of the bearing operating under a design load in the operating environment of the rotating machine, computer readable program code means for selecting a forecast time period, computer readable program code means for calculating a reduced mean-time-to-failure RMTTF of the bearing using the expected designer-determined mean-time-to-failure MTTF and the degraded condition factor BD, computer readable program code means for calculating a probability of failure of the bearing in the forecast time period using the reduced mean time to failure RMTTF, computer readable program code means for accessing cost data corresponding to a cost of failure of the bearing in the rotating machine, computer readable program code means for calculating a financial risk from the calculated probability of failure in the forecast time period and the cost data, and computer readable program code means for displaying the financial risk for the selected time period.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 13 shows an MTTF trend comparison screen.

FIG. 14 shows a screen that allows entry of cost of catastrophic bearing failure, cost of scheduled repair, variable frequency noise filters, gear mesh and harmonic noise rejection and dynamic force DF and probability of failure POF alarm level settings.

MODES FOR CARRYING OUT THE INVENTION

Figure 1:
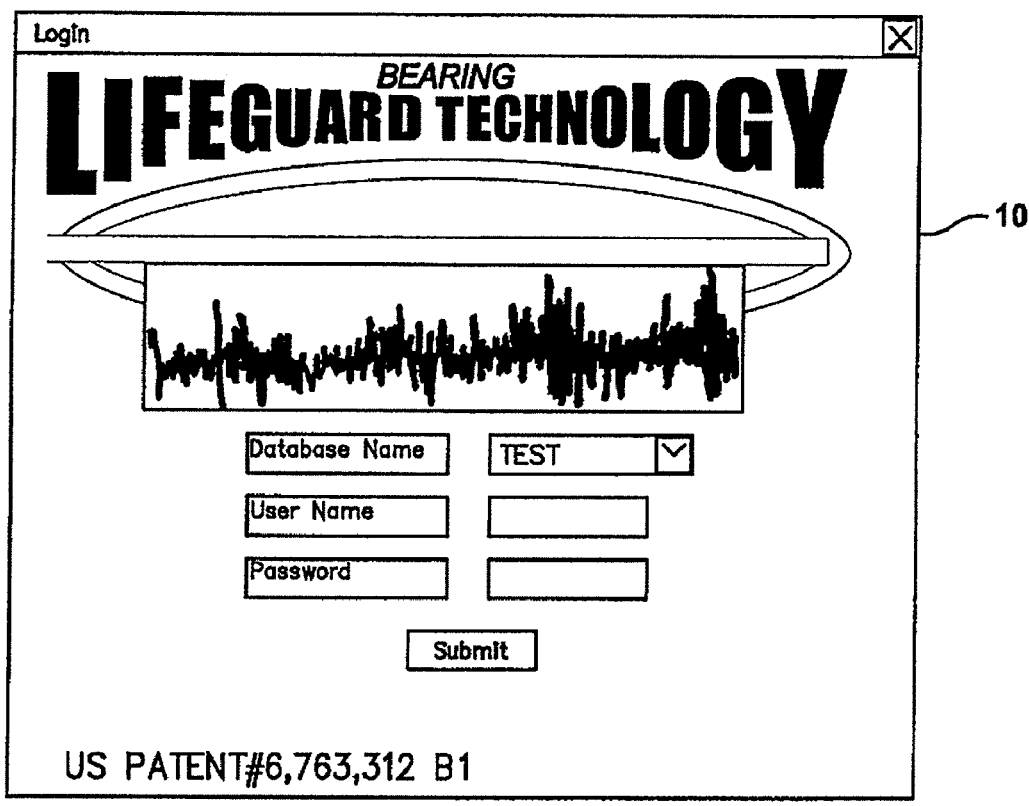
FIG. 1 shows a login screen for the present invention allowing different password protected levels of access.

The present invention is directed to a system for obtaining and presenting information on rolling element bearing condition. Vibration data is obtained from one or more bearings, which may be distributed throughout a production facility on multiple machines. The vibration data for each bearing is stored and analyzed to determine a degraded condition factor BD for the bearing from the vibration data.

The degraded condition factor BD is preferably calculated using discriminant analysis. It most preferably ranges from a minimum when the discriminant analysis indicates a substantially new bearing and a maximum when the bearing is degraded to a point close to failure. Preferably, at least one of the following discriminants is used to calculate BD: a low frequency energy LF discriminant, a high frequency energy HF discriminant, a crest factor CF discriminant, a kurtosis K discriminant, an envelope demodulation ED discriminant and a peak acceleration P discriminant.

It is also preferred to calculate a dynamic force factor DF which relates to dynamic forces applied to the bearing through misalignment, imbalance and similar conditions which may often be corrected by taking appropriate action to balance and/or align the machine. In contrast, the degraded condition factor BD generally relates to worn or damaged bearings that may be corrected only by bearing replacement.

Sources of life shortening vibrations or impacts include:
Imbalance
Misalignment
Eccentric Shaft
Belt Resonance
Other sources of low frequency motion.
High frequency impacts & resonance.

All of these create stress reversals. They are indicated and measured as low frequency bearing housing accelerations and impact energy, adjusted per ISO standards, for flexible or rigid mounting.

Although various methods may be employed for determining the BD and DF factors, the preferred method is with discriminants as will be more fully described below.

The present invention proceeds by selecting an expected designer-determined mean-time-to-failure MTTF for the bearing being analyzed. The designer-determined mean-time-to-failure MTTF may be determined from specifications corresponding to the rotating machine or by assumption of a typical industry standard for MTTF. In one embodiment of the present invention, it may be initially assumed that a typical machine designer will select bearings having a five year MTTF when the rotating machine is operated under its design load, RPM and in the specific operating environment. In the preferred embodiment of the present invention, a user is allowed to vary this designer-determined mean-time-to-failure MTTF.

The selection of a designer-determined mean-time-to-failure MTTF of the bearing operating under a design load in the operating environment of the rotating machine provides a basis for making estimates of the probability of failure POF of the bearing within a defined time period. In the preferred embodiment, the designer-determined mean-time-to-failure MTTF may be obtained using the manufacturer's L10 rating. The L10 bearing life is defined as the number of cycles that 90% of an apparently identical group of bearings will run under specified operating conditions before a spalling defect reaches 6 square millimeters (0.01 square inches).

A typical manufacturer-provided formula for L10 life is:
L10=[(K1*a1*a2*a3)/N][fa*CE/P]10/3    (hours)
K1=16667

K1, a 1, 2, 3 and fa, are manufacturer's constants related to material, environment, reliability %. (ie—a3=0.2 (For 99%) and fa=number of parallel bearings.
CE/P=ratio of rated load to actual load.
N=rotational speed in rpm One major bearing manufacturer specifies L10 for 90 million cycles. ISO 381 specifies the life for one million cycles. As may be seen, the L10 life is inversely proportional to RPM.

Those with skill in this art generally consider the MTTF to be a constant which may be used with known equations, such as the Weibull equation to determine the probability of failure within the time period t given the constant MTTF specified by the manufacturer for bearings having a known load, operated a at given temperature, etc.

The Weibull equation elements are as follows:

$$Re(t) = \text{Prob. of survival} = e - (t - \lambda/\theta - \lambda)k$$

$$Fe(t) = \text{Prob. of failure} = (1 - Re(t))$$

$$Fe(t) = 1 - e - (t - \lambda/\theta - \lambda)k$$

$$\frac{dFe(t)}{dt} = f(t) = \text{Rate of change of } Fe(t)$$

$$f(t) = k\theta - kt(k-1)e - (t - \lambda/\theta - \lambda) \text{ for } k = 1, \lambda = 0$$
$$= 1/\theta \text{et}/\theta$$

Where; k=shape dispersion factor, $\lambda$=location, $\theta$=MTTF, t=time period Most American Bearing manufacturers use $\lambda$=0, k=1.5 for L10. Accordingly, the calculation for a like-new bearing where the BD is minimum is:

POF=[1−(e raised to the minus (t/MTTF) to the 3/2 power)]

In the present invention, however, $\theta$ the MTTF is treated as a variable (identified as RMTTF) which is a function of at least the degraded condition factor BD. The method of the present invention calculates a reduced expected designer-determined mean-time-to-failure RMTTF. The reduced mean-time-to-failure RMTTF of the bearing is calculated using the expected designer-determined mean-time-to-failure MTTF and at least the degraded condition factor BD. In alternative embodiments, a dynamic force factor DF may also be used to calculate RMTTF.

The method of the present invention also includes selecting a forecast time period for a manager. In the preferred embodiment, the forecast time period is initially selected to be ninety (90) days. Also in the preferred embodiment of the invention, the RMTTF is set to the designer-determined mean-time-to-failure MTTF when the degraded condition factor BD is at a minimum. A minimum degraded condition factor BD corresponds to a like new L10 condition bearing. When the degraded condition factor is at a maximum (near failure) the RMTTF is set to the forecast time period.

In the most highly preferred embodiment, the discriminant analysis results in a degraded condition factor BD that varies from less than 1 to 10. When the degraded condition factor BD is minimum it is in like new condition and the RMTTF equals MTTF. The probability of failure POF may be calculated using the Weibull equation above and the L10 information provided by the bearing manufacturer where $\theta \approx 4.81$ L10. For a 90 day forecast period and an assumed MTTF of five (5) years (1825 days) the Weibull equation provides a probability of failure of about 1% indicating that about 1 percent of bearings showing no sign of degradation may be expected to fail within the forecast ninety (90) day period.

When the degraded condition factor BD is at its maximum, the present invention sets RMTTF to the forecast period. Thus the Weibull equation becomes:

POF=1−(e raised to the minus (t/RMTTF) to the 3/2 power)

and RMTTF equals the forecast period which is the time period t. Thus the probability of failure POF is 1−1/e, which equals approximately 63%.

Although it is preferred to use the Weibull equation for determining the probability of failure POF, other POF calculation or estimation methods may be used. It is also possible to include the dynamic force DF factor in the calculation of the RMTTF. The dynamic force factor indicates an increase in cyclic dynamic load that is applied to the bearing above the load that the bearing would carry if correctly balanced and aligned.

Because load is a critical element in determining bearing life, this increase in load due to dynamic force shortens bearing life and may be included as a percentage reduction in bearing life. It may be included in the RMTTF calculation, for example by reducing the MTTF estimate by a percentage, such as twenty percent (20%).

In the preferred embodiment of the method of this invention, the forecast time period is user selectable and is coupled to the step of selecting the designer-determined mean-time-to-failure MTTF. When the forecast time period is doubled, the selected MTTF is doubled. In this way, a user that is less risk averse may select a longer time period than 90 days, such as 180 days and the selected MTTF will be doubled.

After the forecast time period and the reduced mean-time-to-failure RMTTF of the bearing have been determined, the method of the invention proceeds by calculating a probability of failure POF of the bearing in the forecast time period using the reduced mean-time-to-failure RMTTF.

When implemented in software, as a computer program product, the user enters cost data corresponding to a cost of failure of the bearing in the rotating machine. Typically, this cost data corresponds to the cost of a catastrophic and unscheduled bearing failure. It may include costs of labor and parts for bearing replacement, but the greatest cost for some bearing may be the loss of production resulting from an unscheduled shutdown of critical machinery.

The method of this invention proceeds by accessing this cost data corresponding to a cost of failure of the bearing in the rotating machine and calculating a financial risk from the calculated probability of failure in the forecast time period and the cost data. Although different methods of calculating financial risk are contemplated within the present invention, the preferred method is to multiply the probability of failure POF for the applicable time period times the cost data for unexpected failure.

As the bearing reaches maximum degradation, using the preferred method of this invention, it is expected that the bearing will have a 63% probability of failure within the forecast time period and the financial risk will be 63% of the failure cost. For an undegraded bearing the cost may be 1% of the unexpected failure cost.

This financial risk for the selected time period is then displayed for the manager to consider. In another aspect of the invention, the user enters a cost of replacing the bearing, such as the cost of labor and parts for bearing replacement during scheduled maintenance. This cost will normally exclude the substantial cost resulting from loss of production that occurs during a catastrophic unexpected bearing failure.

In this aspect of the method of the invention, the replacement cost data is accessed and a comparison is displayed between the cost of replacing the bearing and the financial risk for the selected time period. The comparison display may be a direct comparison on a display screen where the scheduled replacement cost and the financial risk are both displayed, or it may be an indirect comparison display such as by displaying a warning that the financial risk exceeds the cost of bearing replacement or highlighting the financial risk in a color such as green when the financial risk is less than the cost of scheduled bearing replacement and highlighting the financial risk in red when it exceeds the cost of scheduled bearing replacement.

The expected designer-determined mean-time-to-failure MTTF corresponds to a probabilistic determination of the expected life for the bearing. The bearing condition BD and a designer selected mean-time-to-failure MTTF of the bearing in its operating environment under its operating load are used to calculate a probability of failure POF in a defined time period. The POF in the defined time period is combined with a cost of bearing failure to produce an estimate of financial risk that a manager can use to make decisions about scheduled maintenance and/or replacement of the bearings.

The present invention may be implemented in software to minimize the technical complexity for a user, and present necessary information in an understandable and easy to use format. The software implementation presents a wide variety of technical and non-technical information in a tab selectable format.

The bearing condition analysis of the present invention uses discriminants and related aspects of the Multiple Discriminant Analysis technique described in U.S. Pat. No. 6,763,312.

Referring to FIG. 1, a login screen 10 shows a selectable database name in a drop down menu format to quickly select a database for examination. A user name and password allow the software implementing the present invention to be accessed at different security levels. A technician level allows the collection of vibration data by a user with minimal training to validate and collect bearing vibration data on a tablet or laptop computer, or a dedicated instrument.

The first level user may also record on site observational notes relating to the equipment or bearing being monitored. The user need only scan a barcode for point ID and hit 'collect'. A system screen shows the live signal for validation and then brings up the information screen with overall condition information and a pass/fail alarm indication, if appropriate.

After all points are collected, the data may be examined by a level 2 engineer/analyst, a level 3 administrator/supervisor. In one configuration, vibration data may be manually or automatically collected and uploaded into a central computer for examination, reporting, storage or addition to a central database.

The engineer/analyst level can access all the raw data, factors, discriminants, spectra from all or only 'failed' items needing attention. The system provides notes on recommended actions.

The level 3 administrator/supervisor access allows a manager to assign user passwords, create work plans, adjust coefficients, alarm levels, otherwise define and configure individual machines, fixed or variable speed, gear driven, flex or rigid mount, etc. and lay out desired work areas and sequence.

Figure 2:
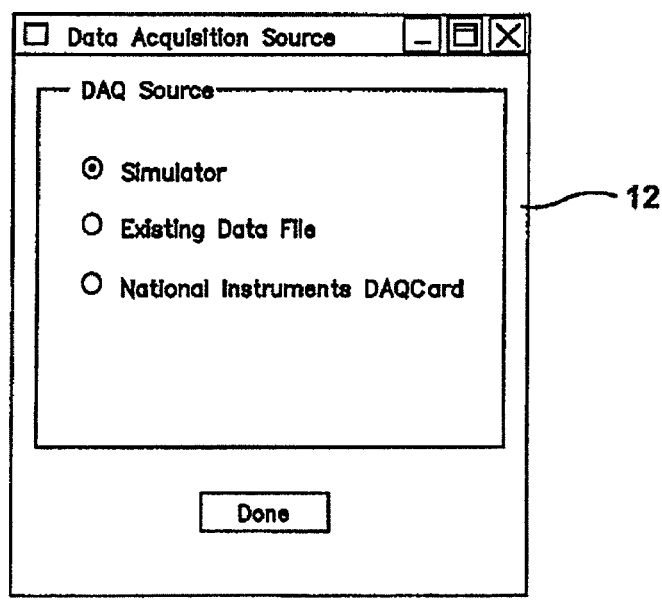
FIG. 2 shows a vibration data source selection screen for the present invention.

Referring to FIG. 2, a vibration data acquisition source screen 12 is shown. A user may select a source of data to be analyzed. The source may be previously obtained vibration data in an existing data file, new data from a data acquisition (DAQ) card or simulated data allowing analysis of simulated vibration data for system checkout and calibration. The system accepts the input signal from an accelerometer sensor of defined character, mounted securely and properly on the machine bearing housing and available to the user.

Figure 3:
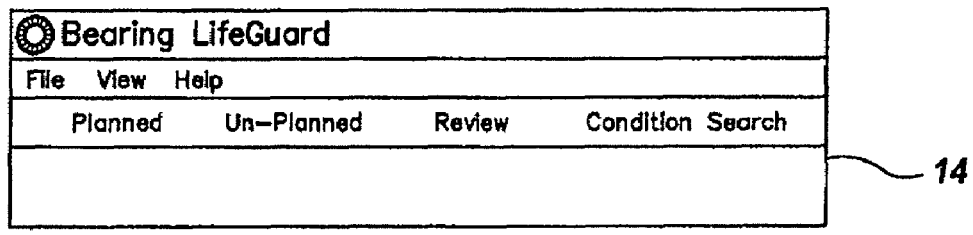
FIG. 3 shows a system screen allowing different vibration data collection and review functions.

Referring to FIG. 3, an overall system screen 14 is shown. The user is allowed to select operation from a supervisor planned route or an ad-hoc unplanned route. The "route" corresponds to an ordered list of bearings. This typically includes bearings in production equipment organized by the supervisor in a way that allows the data to be collected an analyzed in a specific sequence. This screen allows a data collector to select any available machine point to collect data and provides a review function to display and quickly review previously collected data points. A condition search function is provided that allows user to search and display only those points that exceed user selected criteria.

Figure 4:
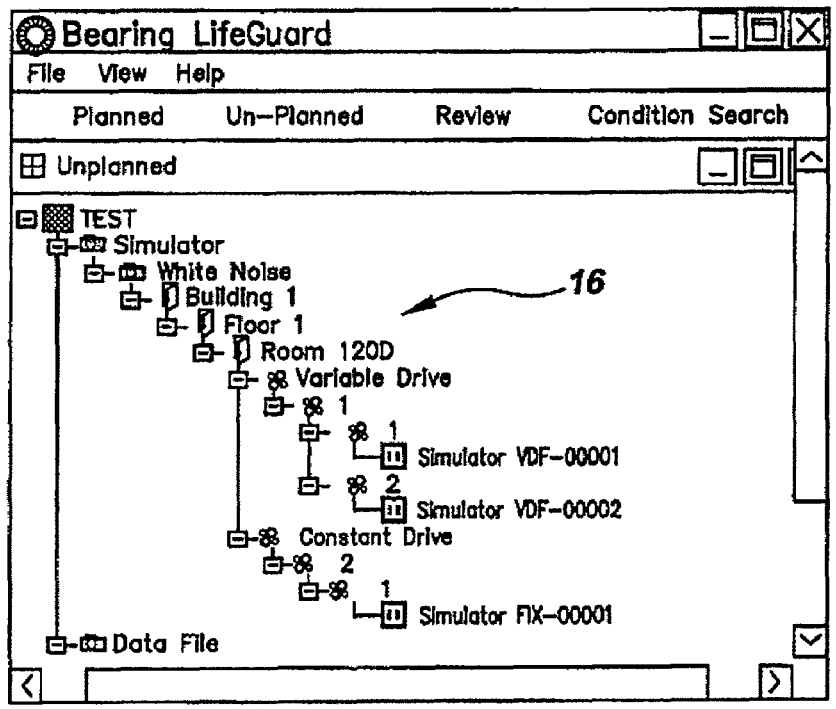
FIG. 4 shows a typical facility monitored point database display tree.

FIG. 4 shows a screen displaying a typical facility monitored point database tree 16. Data points may be selected by highlighting or barcode scan. The tabs for selecting Random asset selection or Planned asset sequence or Review of previously collected data. The asset tree shows a typical manufacturing facility organized by facility, building floor, room and asset ID number. The user may collect data in a random/unplanned fashion by going to each desired data collection point in any desired sequence, or in a previously planned specific sequence.

Figure 5:
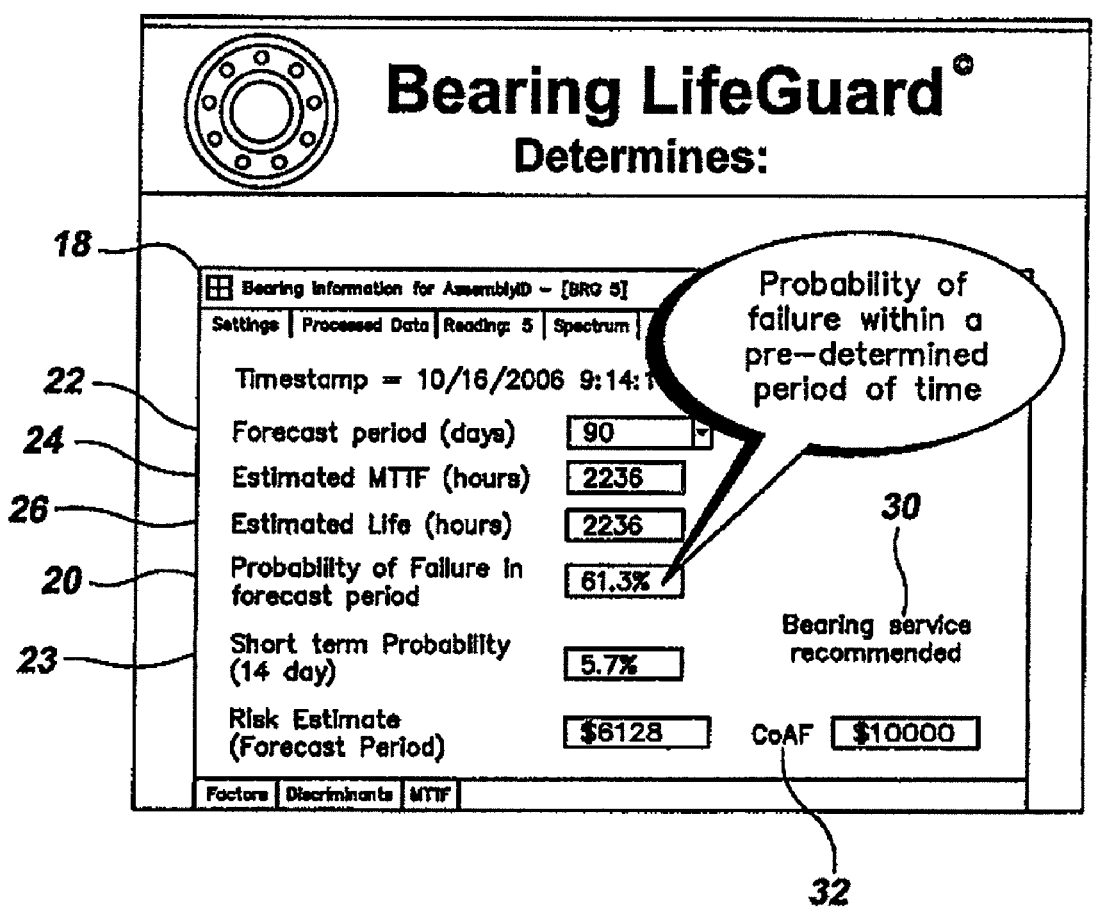
FIG. 5 shows an information screen display with Probability of Failure percentages displayed.

FIG. 5 shows an information screen 18 display with a probability of failure POF percentage 20 displayed for a specific bearing. The probability of failure POF percentage shown is for failure within the forecast period. The forecast period 22 is selectable by the user. The degraded condition factor BD for the bearing has been calculated from the vibration data for this bearing and the calculated value of the reduced mean-time-to-failure RMTTF using the degraded condition factor BD is shown to the user and labeled "Estimated MTTF" 24. As can be seen in FIG. 5, this screen also shows an estimated bearing life 26 that is the same as the reduced mean-time-to-failure RMTTF 24. This indicates a low value for the dynamic force factor DF.

Figure 6:
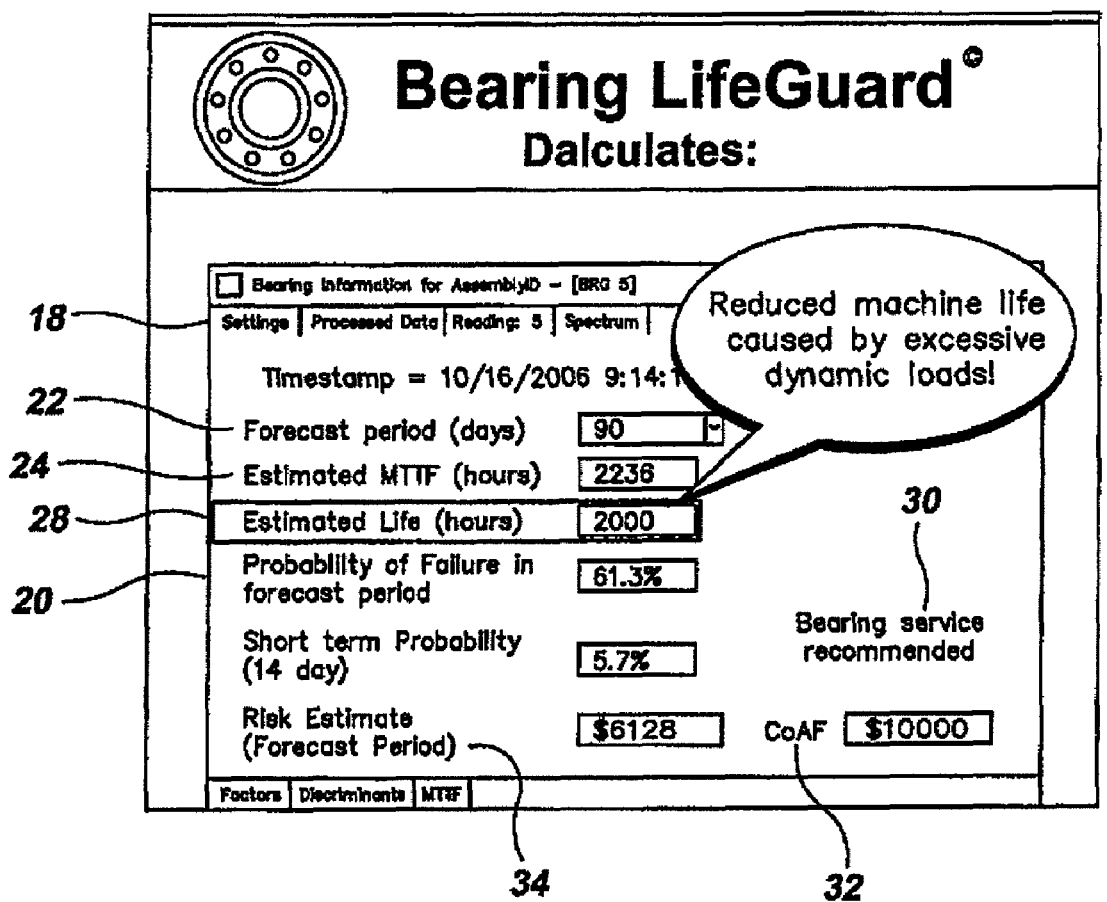
FIG. 6 shows an information screen with estimated bearing life reduction.

FIG. 6 shows the same information screen seen in FIG. 5 except that the discriminants calculated from the vibration data now have a higher dynamic force factor DF resulting in a percentage reduction in bearing life. The present invention may use only BD, or both BD and DF in the calculation of RMTTF. If both BD and DF or the discriminants used to produce those factors are used, then the effects of both bearing degradation and correctable problems, such as misalignment or imbalance will be used to calculate the POF and RMTTF. If only BD is used, then the calculation of RMTTF will relate primarily to the effects of bearing degradation.

Regardless, however, it is desirable to show how correcting imbalance and misalignment will reduce dynamic force and increase bearing life. In FIG. 6, this can be seen by comparing RMTTF 24 (having the numeric value 2236 hours in FIG. 6) to the estimated life 28 24 (having the numeric value 2000 hours).

FIGS. 5 and 6 also show a user corrective action warning 30 being displayed.

The warning shown was caused by high probability of bearing failure. FIGS. 5 and 6 include a display of the cost data 32 corresponding to the cost of an actual catastrophic failure of the bearing. In this example, that cost is $10,000. The POF 20 in the forecast period 22 is 61.3% in the example shown. The screen shows the resulting financial risk 34 within the forecast period as 61.3% of the $10,000 cost of such failure, i.e., approximately $6128.

Figure 7:
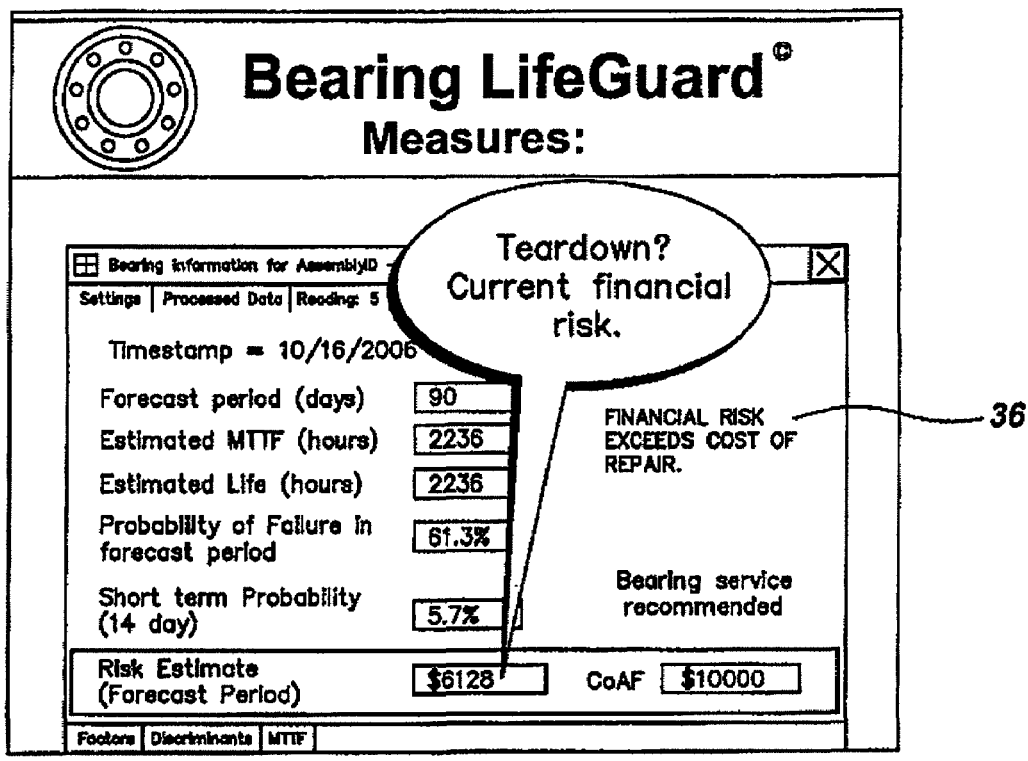
FIG. 7 shows a user warning that financial risk exceeds cost of scheduled repair.

FIG. 7 shows the same screen seen in FIG. 5, except that the user has entered a cost of scheduled repair and set an alarm to warn when the financial risk exceeds the cost of scheduled repair. In FIG. 7, the warning alarm has been triggered providing warning 36 that the financial risk exceeds the cost of scheduled repair. In the example shown, the cost of scheduled repair has been set below $6128 and the financial risk exceeds that amount.

The screen seen in FIGS. 5-7 also shows a preferred short-term probability of failure 23. In the preferred embodiment of this invention, the short term is fixed at two weeks. The short term probability of failure within a time period t may be calculated with the Weibull equation using the reduced mean-time-to-failure RMTTF.

The forecast period seen in the information screen of FIGS. 5-7 is user selected and is related to operating speed (RPM) of the machine. The financial risk is preferably color-coded to appear in red when financial risk exceeds the cost of scheduled repair.

Figure 8:
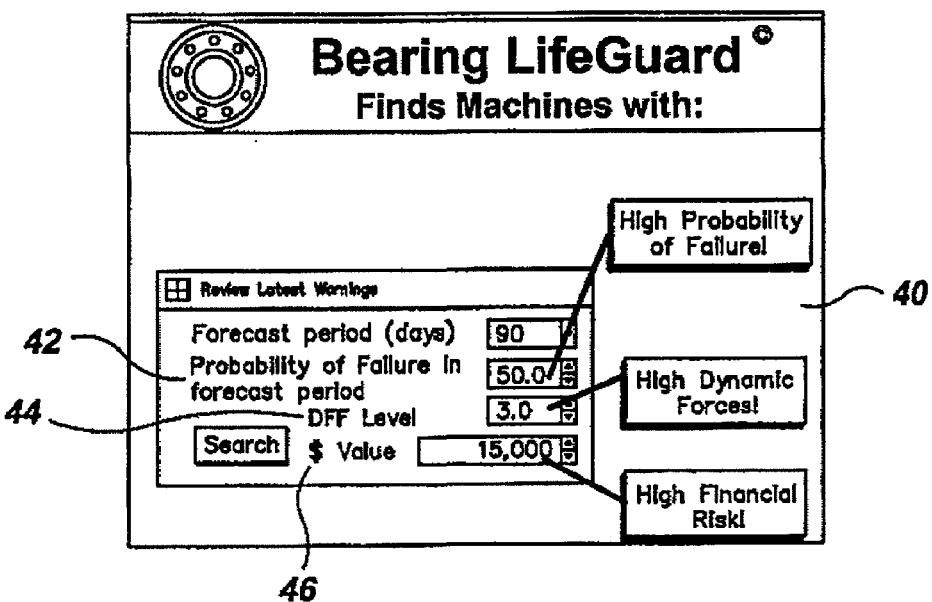
FIG. 8 shows a condition search screen.

FIG. 8 shows a bearing condition search screen 40 in which various search criteria may be used to locate bearing exceeding certain user specified limits. Bearings that exceed a certain probability of failure POF in the forecast period may be located with search criteria 42. These bearings may need replacement during scheduled maintenance. Bearings that have a high dynamic force DF value may be identified by search criteria 44. These bearings may have their effective life lengthened by balancing, alignment or other maintenance that reduces the DF value. Finally, bearings presenting a large financial risk may be identified with search criteria 46. The failure of these bearings will be expensive and may be considered for replacement even if the probability of failure POF in the forecast period is lower than that of other less critical bearings.

Figure 9:
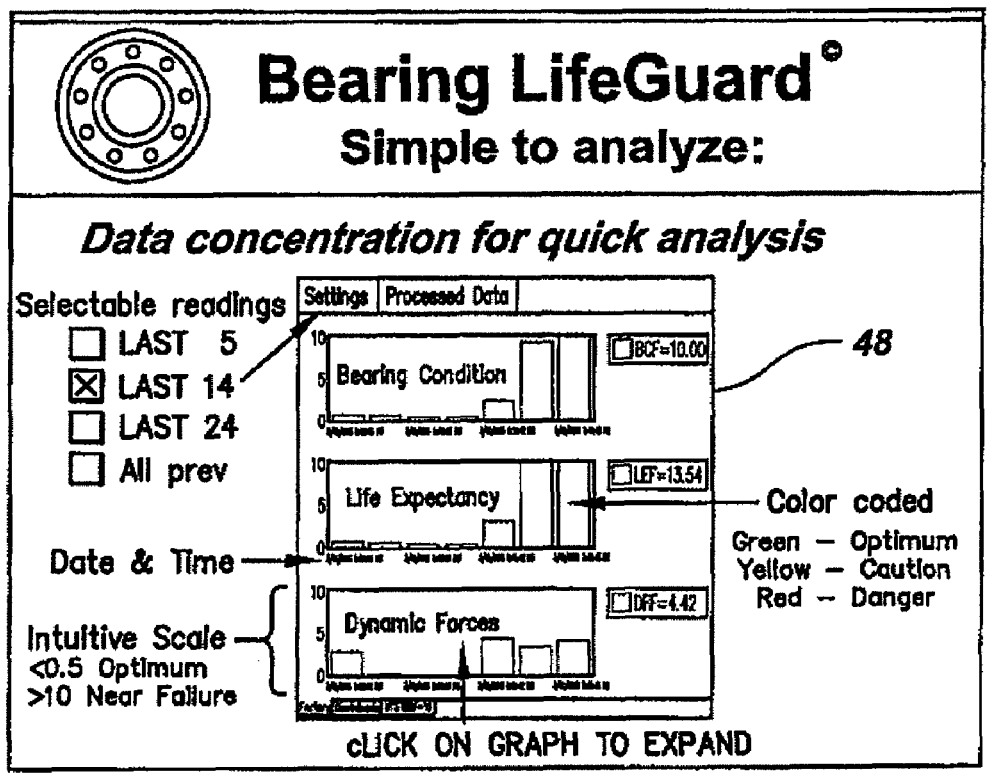
FIG. 9 shows a bearing factor screen.

FIG. 9 shows a bearing factor screen 48 in which degraded bearing condition factor BD, life expectancy and dynamic force factor DF may be compared in a time stamped dated trend of the last five to twenty four measured values. The display shows the bar graph or line graph magnitude of the factors over a selected range. The background of the graph ranges from green at the bottom for normal level to red at the top for cautionary levels. The bars of the graph penetrate the background colors of the display from green to yellow to red as the magnitude of the factor increases from normal to cautionary levels. The numerical value of the most recent factor value is displayed at the right of the graph. A look at this screen allows a user to quickly assess three key contributors to bearing condition. Since BD and DF both affect the life for different reasons, the user can readily see which factor is pointing to the problem.

Figure 10:
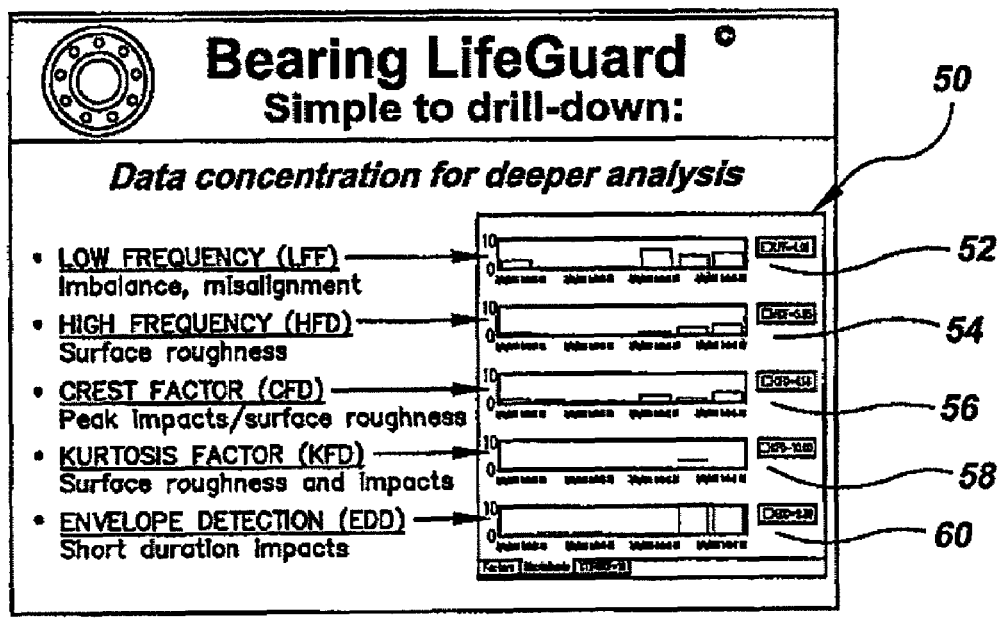
FIG. 10 shows bearing discriminants.

FIG. 10 shows a screen 50 displaying multiple discriminants, including a low frequency energy LF discriminant 52, a high frequency energy HF discriminant 54, a crest factor CF discriminant 56, a kurtosis factor KF discriminant 58 and an envelope detection ED discriminant 60. A peak acceleration discriminant may also be optionally used and displayed.

The system processes the vibration signal using multiple discriminants, which include at least one of the discriminants above. The system then combines the discriminants to derive the BD, DF and LE life expectancy factors. BD relates to bearing condition. DF relates to dynamic forces that act to reduce bearing life. Life Expectancy LE—combines BD and DF in a weighted fashion and to estimate long term bearing life. The values thus obtained are also scaled 0 to 10 and are used to provide actionable information directly to the user.

The LF (Low Frequency) discriminant captures the RMS (root mean square value) of all the low frequency accelerations including those caused by misalignment and rotational imbalance, up to approximately four times the rotational frequency.

Accelerations measured near the bearing load zone most accurately reflect the bearing ball/race/housing interface contact forces. Level corrections are made for rigid or flexibly mounted systems. This value is converted to a 1-10 metric.

Imbalance, misalignment, belt resonance, warped shaft faults, and other such factors, that act to exert dynamic forces on the bearing element-race interfaces in a manner that reduces bearing life expectancy in rotating machinery, manifest themselves at frequencies at or near to the fundamental rotating frequency of the machine. For example: the dynamic force produced by a rotational imbalance is equal to the offset mass times the angular velocity squared divided by the radial offset.

Force=mass×$V^2$/r Dynamic and static load forces influence life in an exponential fashion $(C1/C2)^{10/3}$ where C1=rated load and C2=applied load.

Warped shafts, misaligned couplings contribute in the same fashion. All of these occur at frequencies close to the rotational frequency, and are the principal contributors to the dynamic force contribution. Most common industrial machines operate at rotational frequencies in the range below 7200 RPM (120 Hz). The LF discriminant accepts the raw vibration signal, filters it to allow only inclusion of frequencies above 180 RPM (3 Hz) and below 21,600 RPM (360 Hz), less than four times the 7200 RPM rotational speed. The upper corner frequency may vary for very low speed or very high speed machines but should be roughly less than four times the shaft rotational frequency.

For lower or higher speed machines the filter upper corner may be conveniently shifted up or down by means of a motor speed selection button. The analysis may be digital or analog. A low frequency filter allows these signals to pass and then converts the signal to a normalized RMS (root mean square) value. When this value is excessive it alerts the practitioner to a condition that will eventually reduce the expected life of the bearing and raise costs. It also is clearly related to low frequency balance, alignment, belt resonance, eccentric shaft, or other such problem which can be determined by a skilled practitioner, all of which are referred to as 'Dynamic' forces. In accordance with one aspect of the invention the LF discriminant is modified to provide a composite stand alone signal indicative of a Dynamic Force factor (DF) representative of the dynamic forces on the bearing The CF (Crest Ratio) discriminant measures the average ratio between the peak value of high frequency acceleration spikes and the RMS value of the acceleration energy. The character of this measurement is such that it is very sensitive to micro cracks in the bearing/race surfaces. It may be high on a new bearing and often declines after run in and increases to higher values in the latter stages of failure.

As part of the process of rolling element bearing deterioration, microscopic cracks develop on the rolling surface of the bearing, or the race. As the bearing rotates, these cracks contact the smooth opposing surfaces of the bearing and race. When the surfaces impact they generate very high amplitude, short duration, acceleration spikes, sometimes referred to as Dirac function spikes. Crest factor is the ratio of the time domain peak value of these transient impact accelerations to the overall RMS value of the selected vibration signal band. If the bearings were new, and the surfaces perfectly smooth, the vibration would be near sinusoidal and the crest factor would approach a sinusoidal value of peak to RMS ratio of 1.414. When defects develop, the Dirac peaks begin to increase in magnitude, but because they are of short duration they contribute very little energy to the RMS value, and the ratio of peak to RMS begins to increase. The CF value will rise, reaching values of four to seven or more. As the failure process continues, the surface discontinuities will begin to wear, and the CF value will begin to decrease just prior to failure. Trending this CF value is a very good indicator of bearing condition and impending bearing failure, but requires specialized equipment and a highly skilled practitioner for effective implementation. The invention utilizes a DC value derived from the value of Crest Factor referred to as CF.

$CF$ is proportional to the expression $p_i=(x_i-ü)/ü$

Where:
$p_i$=crest factor,
$x_i$=Instantaneous sampled value, and
ü=RMS value of sampled waveform.

Typical variations in this variable ratio experienced in practice range from 1.5 to 7.0.

The HF (High Frequency) discriminant is a measure of high frequency accelerations indicating general surface irregularities, roughness and surface degradation. Microscopic impacts do not contribute significantly to this level because of their short duration and low energy.

When a rolling element bearing begins to degrade the subsurface fatigue migrates to the bearing surfaces which begin to develop microscopic surface defects. As the balls pass over the surface, they begin to generate highly scattered, high frequency impact energy, with periodicity roughly related to mathematical ball and race geometry, but with many generally unpredictable frequency components. Experience indicates that the bulk of the acceleration energy is contained in the high frequency region between 200 Hz and 13 kHz, and follows a somewhat predictable pattern during the failure process.

The HF discriminant aggregates high frequency data in the range of approximately four times the primary rotational frequency up to 13,000 Hz. In accordance with the invention the RMS value of the energy is converted to a value that is generally proportional to energy of the vibration levels caused by rolling element bearing ball defects, inner and outer race defects, along with element rubs, and cage resonance. As an additional feature the raw input signal, prior to filtering, may be made available for more detailed spectral analysis by the practitioner.

The KF (Kurtosis) discriminant provides an exponential measure of both the short duration peak impacts and the HF RMS energy. It will respond strongly to a bearing with rough surface spalling and micro surface fatigue crack degradation. It is a highly reliable indicator of a near failure condition.

The Kurtosis factor KF is a statistical measure of time waveforms peakedness. It is similar to Crest Factor CF in that it is also a ratio, but is the fourth moment of the peak & RMS differential, and is therefore much more sensitive to changes in the peak value. In the invention a modified Kurtosis value KF is derived from the sampled peak and the overall RMS value. Since it represents the fourth moment, the KF discriminant is nonlinear, and is slightly more sensitive to early stages of bearing surface degradation than CF. This is especially valuable when early detection of incipient bearing failure is critical. A typical example would be a cooling pump in a nuclear power plant.

$KF$ is proportional to $m4=\Sigma(xi-ü)^4/n$ between $i=0$ and $i=n$

Where
n is the number of samples, and
m4=the mean Kurtosis value,
xi=averaged peak instantaneous value of sampled signal,
n=the number of samples, and
ü=the root mean squared value of time signal The ED (Envelope) discriminant is sensitive to shock impact ringing in the measurement system caused by impact durations near or less than the accelerometer resonant period.

It converts the RMS of the demodulated signal to a 1-10 metric, which typically increases dramatically in a near failure condition.

ED is used to detect early stages of bearing degradation. This technique also uses the high energy Dirac impulse phenomena described in the Crest Factor CF description, to extract still another form of defect information from the acceleration signal. The high energy Dirac spikes cause energy to be propagated throughout the frequency spectrum and initiate excitation of the vibration sensor crystal resonant frequency. This crystal frequency, often above 20/30 kHz, acts as a carrier. This carrier is modulated by the low frequency bearing ball spin and inner/outer race impacts. By band passing energy centered around the resonant frequency, detecting it and passing it through a low pass demodulation filter the low frequency envelope of the signal that contains information on the classic rolling element bearing defect impact frequencies, may be extracted. In a typical embodiment, this band is converted to a value that is proportional to the RMS magnitude of the demodulated defect energy. In addition, the real time, demodulated signal is made available and may be analyzed by the practitioner, to provide detailed spectral information on the nature of the defect if required. The demodulation information may be obtained by other means, for example by Hilbert transform techniques.

Peak accelerations may also be converted to a metric which may be factored into the BD calculation. The value of P is preferably not displayed as a distinct discriminant. The discriminants are displayed in a time stamped bar graph form and may be examined as the last five, last fourteen, last 24 or all, for purposes of observing changes or trends over time.

The discriminant values are weighted and combined to produce BD in which each analysis technique votes on the bearing surface condition. A reading of 1 indicates a like new, near optimum operating condition and a 10 reflects diagnostic agreement that the bearing is near failure.

The final 1-10 LE life expectancy factor reflects the life shortening influence of the DF low frequency dynamic forces and alerts the user to reduced bearing life resulting in increased costs. When DF exceeds a preset limit the user is warned to check balance and alignment. The uniform 1-10 metric system allows the user to quickly assess the system condition and puts all of the complex processing activity out of sight.

Figure 11:
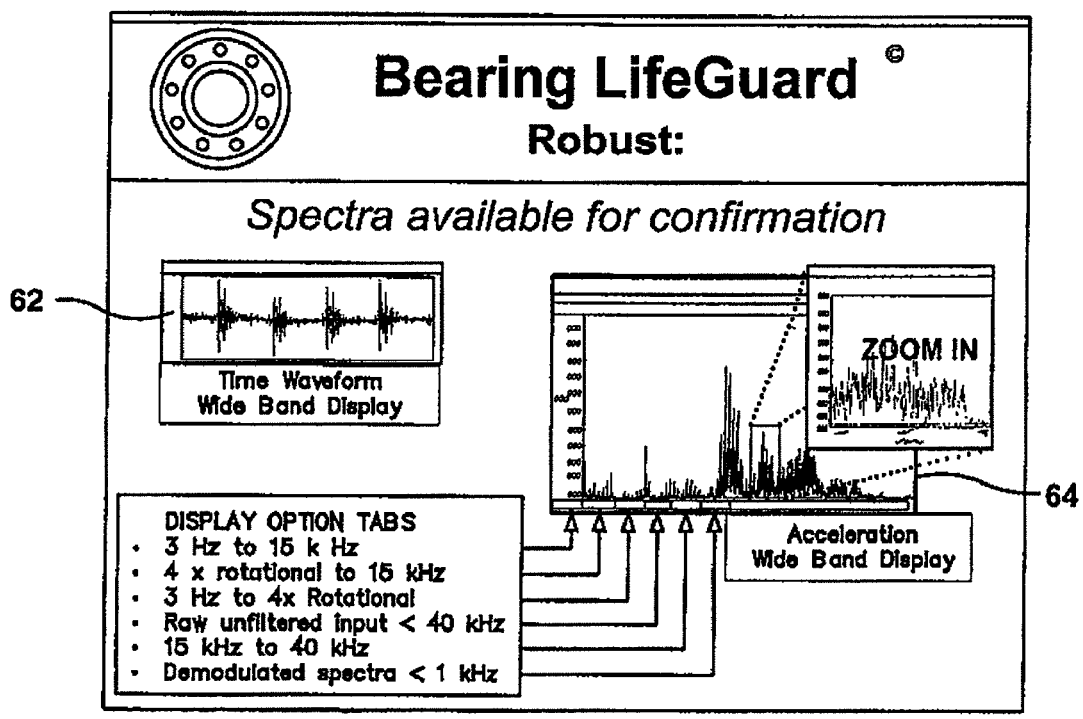
FIG. 11 shows a time history and spectrum display.

FIG. 11 shows time history 62 and spectrum 64 displays derived from the vibration data. These may be used by the technical expert for confirmation or additional analysis. The acceleration signal time history or the frequency spectra may be used for more detailed analysis of critical faults. The data may be viewed in several forms as follows:

High Frequency (HF) band limited acceleration from approximately four times rotational to fifteen kHz used for Crest Factor and Kurtosis discriminant calculation. By using HF for the discriminant diagnostics, effects of low frequency balance and alignment anomalies on bearing diagnostics are minimized.

Low Frequency (LF) band limited acceleration and velocity time signals in the range of 3 Hz to 4× rotational. Used for calculation of DF.

Very high frequency (VHF) acceleration ringing signals from 15 kHz to 25 kHz.

Demodulated VHF acceleration signals used for ED calculation.

The system of this invention provides the ability to change scale settings and signal time base to allow detailed waveform or spectral frequency components to be examined when required. The system also allows side by side examination of up to 24 of the last data collections on a point or of related points. The system also allows transfer of detailed raw signal to an external expert system for independent analysis if required.

These options and screens allow the skilled user to examine in detail the nature of the incoming acceleration signals to virtually any desired level including frequency zoom and a moveable cursor that allows identification of peak frequency and acceleration RMS level.

Figure 12:
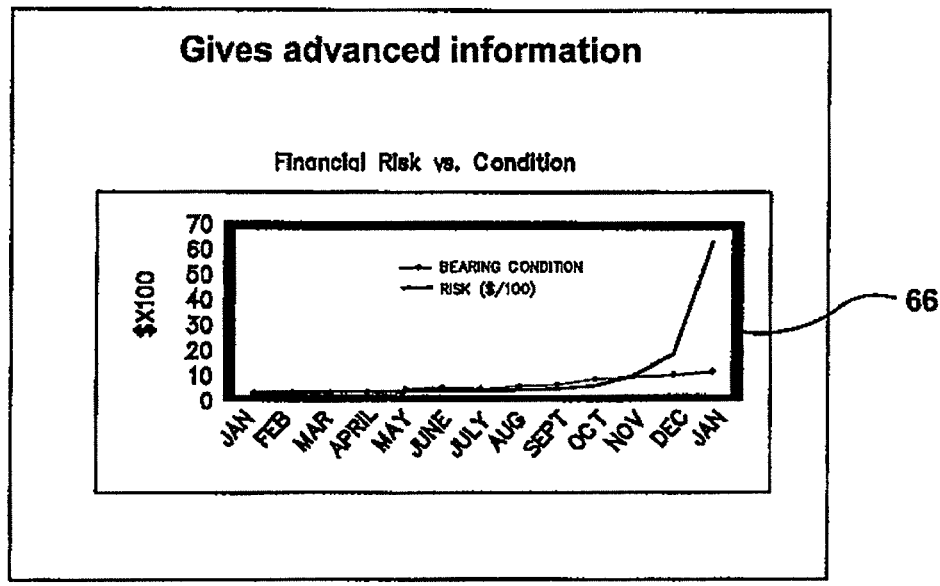
FIG. 12 provides a graphical illustration of how financial risk varies with bearing degradation.

FIG. 12 shows a display 66 of how financial risk varies with BD over time. As the bearing degrades, BD rises, RMTTF decreases, POF in the forecast time period increases and the financial risk rises.

FIG. 13 shows two screens 68, 70 illustrating how MTTF may be trended and compared for a single department having multiple bearings or for two different departments, each having a different group of bearings.

FIG. 14 shows a database utility screen 72 that allows an authorized user to define a cost of catastrophic failure of a bearing 74, a cost of scheduled repair 76, flexible versus rigid mounting compensation 78, variable frequency drive 80 and gear drive 82 for a bearing specified at the top of the screen. Entries for gear ratio and teeth on the gear drive 84, as well as upper and lower frequency limits for two notch filters 86, 88 allow vibration frequency exclusion data to be defined. The vibration frequency exclusion data prevents various defined frequencies from entering into and interfering with the bearing degradation BD and dynamic force DF calculations. Dynamic force DF 92 and POF 90 alarm level settings may also be entered on this screen.

Gear mesh impacts and variable frequency drive current/voltage switching cause vibrations that can interfere with and create errors in bearing fault diagnostic analysis. The system of this invention allows the user to select one or more user adjustable band rejection notch filters to minimize the effect of VFD switching noise. It also provides automatic rejection of first and nth order gear mesh frequencies and their harmonics by allowing the user to select gear drive teeth and gear ratio. Given that input information the bands associated with the first and second order gear frequencies and side bands will be suppressed.

The elements of the system of this invention are preferably laid out in a user friendly tab selectable fashion as illustrated in the various screens.

The present invention relates the BD to bearing condition. The Wiebull equation uses the equation with e raised to the minus t/MTTF to the 3/2 power. By assuming that MTTF varies with bearing condition from like new to near failure and relating MTTF to BD reduced by DF, the method of the invention then uses BD or BDC reduced by DF to calculate POF (Probability of Failure), a new MTTF=RMTTF, expected life, a short term MTTF and financial risk all from BD or BD reduced by DF. The present invention also allows the user to select the degree of risk he wishes by allowing him to select the forecast period for BD=10.

The typical bearing designer for the original system manufacturer is assumed to design for a five year MTTF equivalent of L10 bearing life. To accomplish this, the designer must take into account system rotational speed and bearing load ratings. In special cases where specific design life is known the system optimum MTTF may be adjusted to reflect the increase or decrease.

Based on testing, new optimum condition bearings have a BD value<0.5. On this basis a maximum value for BD is assigned. A bearing with a BD of 10 is severely degraded, close to failure and should be replaced.

In order to estimate POF a forecast period (t) is chosen which has a reasonably low near term risk of failure but yet sets a defined recommended time for action. A reasonable default is 90 days (2160 hrs.)

The BD and the Weibull failure equation track very well up to t/MTTF=1, the 63% failure probability point. That is, a linear increase in BD may be directly linked to a linear decrease in MTTF to the 63% probability of failure point. Thus, BD provides a reliable indicator of bearing degradation. Based on this, a BD unit value can be derived which allows estimation of how much MTTF degrades per unit increase in BD. A forecast period (t) can be chosen for calculating POF. As a default, the forecast period can be set at 90 days, a reasonable time for scheduling action to repair or replace the bearing.

The preferred embodiment limits failure estimation to 63% where t/RMTTF=1 where the Wiebull trend and BD have exhibited high correlation. The failure probability may be extended beyond this by using higher t/RMTTF ratios and an appropriate revised relationship between BD and RMTTF.

This analysis method provides a simple yet effective way to provide the probability of failure based on the value of BD. The predicted RMTTF is the assumed 5 year (or other) MTTF reduced by BD times the unit value and is equal to the selected forecast period when BD=10.

If the forecast period is changed the unit value of RMTTF changes because the user has redefined how much time is represented by t and therefore how many hours BD=10 represents. When t=RMTTF the probability of failure is estimated at 63%. Therefore the probability of failure does not change when a user changes the forecast period, only the estimated RMTTF changes.

This has the added value of allowing the user to determine how much risk is tolerable in a given situation. The forecast period on a non-critical system may be set at 180 days, while a critical, safety or high avoided cost system may be set at 45 days. The latter demands more immediate action on the part of the maintenance group.

The present invention works well with 4-20 ma systems and provides all the analytic benefits of high frequency, ultrasonic analysis not possible in a 4-20 ma signal. The system of this invention has been found to be effective on belt driven, directly or flexibly coupled motors, pumps and compressors, at running speeds from 1750 to 7200 RPM with consistently good results. The design of this invention may be adjusted for use with lower speed machines. A user may select a 90 day forecast period for 3600 RPM, or more aggressive or conservative 45, 60, 180, or 270 day period for any selected machine. Variable speed machines are run at a constant, consistent speed when collecting data to provide meaningful trending. Because gear driven assemblies may produce extraneous gear mesh noise not related to the bearing, the present invention allows for the rejection of selected gear mesh frequencies.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of analyzing vibrations of a bearing installed in a rotating machine comprising the steps of:
    accessing vibration data corresponding to the bearing to be analyzed;
    determining a degraded condition factor BD for the bearing from the vibration data;
    selecting an expected designer-determined mean-time-to-failure MTTF of the bearing operating under a design load in the operating environment of the rotating machine;
    selecting a forecast time period;
    calculating a reduced mean-time-to-failure RMTTF of the bearing using the expected designer-determined mean-time-to-failure MTTF and the degraded condition factor BD;
    calculating a probability of failure of the bearing in the forecast time period using the reduced mean-time-to-failure RMTTF;
    accessing cost data corresponding to a cost of failure of the bearing in the rotating machine;
    calculating a financial risk from the calculated probability of failure in the forecast time period and the cost data; and
    displaying, on a computer display, the financial risk for the selected time period.

2. The method of analyzing vibrations of a bearing installed in a rotating machine according to claim 1 wherein the step of determining a degraded condition factor BD for the bearing from the vibration data comprises determining a plurality of discriminants from the vibration data and using the plurality of discriminants to calculate the degraded condition factor BD for the bearing.

3. The method of analyzing vibrations of a bearing installed in a rotating machine according to claim 2 wherein at least one of the plurality of discriminants is selected from a group consisting of a low frequency energy LF discriminant, a high frequency energy HF discriminant, a crest factor CF discriminant, a kurtosis K discriminant, an envelope demodulation ED discriminant and a peak acceleration P discriminant.

4. The method of analyzing vibrations of a bearing installed in a rotating machine according to claim 3 wherein the plurality of discriminants used to calculate the degraded condition factor BD includes the high frequency energy HF discriminant.

5. The method of analyzing vibrations of a bearing installed in a rotating machine according to claim 1 wherein:
    the degraded condition factor BD for the bearing varies from a minimum to a maximum; and
    wherein the step of calculating a reduced mean-time-to-failure RMTTF of the bearing using the expected designer-determined mean-time-to-failure MTTF and the degraded condition factor BD comprises setting the RMTTF equal to the expected designer-determined mean-time-to-failure MTTF when the degraded condition factor BD for the bearing is at the minimum and setting the RMTTF equal to the forecast time period when the degraded condition factor BD for the bearing is equal to the maximum.

6. The method of analyzing vibrations of a bearing installed in a rotating machine according to claim 5 wherein the reduced mean-time-to-failure RMTTF linearly varies from the expected designer-determined mean-time-to-failure MTTF to the forecast time period as the degraded condition factor BD for the bearing varies from the minimum to the maximum.

7. The method of analyzing vibrations of a bearing installed in a rotating machine according to claim 5 wherein the selected forecast time period corresponds to the selected designer-determined mean-time-to-failure MTTF and varying the forecast time period varies the selected designer-determined mean-time-to-failure MTTF.

8. The method of analyzing vibrations of a bearing installed in a rotating machine according to claim 1 wherein the step of calculating a probability of failure of the bearing in the forecast time period using the reduced mean-time-to-failure MTTF comprises calculating a probability of failure POF within a time period t using a reduced mean-time-to-failure RMTTF according to the equation:

$POF=1-(e$ raised to the minus $(t/RMTTF)$ to the 3/2 power).

9. The method of analyzing vibrations of a bearing installed in a rotating machine according to claim 1 further including the step of determining a dynamic force factor DF from the vibration data and wherein the step of calculating a reduced mean-time-to-failure RMTTF of the bearing comprises calculating a reduced mean-time-to-failure RMTTF of the bearing using the designer-determined mean-time-to-failure MTTF, BD and DF.

10. The method of analyzing vibrations of a bearing installed in a rotating machine according to claim 9 wherein the steps of determining a degraded condition factor BD for the bearing and determining a dynamic force factor DF from the vibration data comprise determining a plurality of discriminants from the vibration data and using the plurality of discriminants to calculate the degraded condition factor BD and the dynamic force factor DF for the bearing.

11. The method of analyzing vibrations of a bearing installed in a rotating machine according to claim 10 wherein at least one of the plurality of discriminants is selected from a group consisting of a low frequency energy LF discriminant, a high frequency energy HF discriminant, a crest factor CF discriminant, a kurtosis K discriminant, an envelope demodulation ED discriminant and a peak acceleration P discriminant.

12. The method of analyzing vibrations of a bearing installed in a rotating machine according to claim 10 wherein the degraded condition factor BD is calculated from a high frequency energy HF discriminant, a crest factor CF discriminant, a kurtosis K discriminant, an envelope demodulation ED discriminant and a peak acceleration P discriminant and the dynamic force factor DF is calculated from a low frequency energy LF discriminant and a percentage of the high frequency energy HF discriminant.

13. The method of analyzing vibrations of a bearing installed in a rotating machine according to claim 11 wherein the plurality of discriminants used to calculate the dynamic force factor DF includes the low frequency energy LF discriminant.

14. The method of analyzing vibrations of a bearing installed in a rotating machine according to claim 13 wherein the plurality of discriminants used to calculate the dynamic force factor DF includes the low frequency energy LF discriminant and a percentage of the high frequency energy HF discriminant.

15. The method of analyzing vibrations of a bearing installed in a rotating machine according to claim 9 wherein the selected forecast time period corresponds to the selected designer-determined mean-time-to-failure MTTF and varying the forecast time period varies the selected designer-determined mean-time-to-failure MTTF.

16. The method of analyzing vibrations of a bearing installed in a rotating machine according to claim 9 wherein the step of calculating a probability of failure of the bearing in the forecast time period using the reduced mean-time-to-failure RMTTF comprises calculating a probability of failure POF within a time period t using a reduced mean-time-to-failure RMTTF according to the equation:

$POF=1-(e$ raised to the minus $(t/RMTTF)$ to the 3/2 power).

17. The method of analyzing vibrations of a bearing installed in a rotating machine according to claim 1 further including the step of calculating and displaying a probability of failure within a short term time period using RMTTF where the short term time period is less than the forecast time period.

18. The method of analyzing vibrations of a bearing installed in a rotating machine according to claim 1 further including the steps of:
   accessing cost data corresponding to a cost of replacing the bearing in the rotating machine; and
   displaying a comparison between the cost of replacing the bearing and the financial risk for the selected time period.

19. The method of analyzing vibrations of a bearing installed in a rotating machine according to claim 1 further including the steps of:
   accessing cost data corresponding to a cost of replacing the bearing in the rotating machine; and
   displaying a warning based on a comparison between the cost of replacing the bearing and the financial risk for the selected time period.

20. The method of analyzing vibrations of a bearing installed in a rotating machine according to claim 1 further including the step of accessing vibration frequency exclusion data and wherein the step of determining a degraded condition factor BD for the bearing from the vibration data comprises determining a degraded condition factor BD for the bearing from vibration data that excludes a range of vibration frequencies specified by the vibration frequency exclusion data.

21. The method of analyzing vibrations of a bearing installed in a rotating machine according to claim 20 wherein the vibration frequency exclusion data defines vibration frequencies corresponding to a variable frequency drive.

22. The method of analyzing vibrations of a bearing installed in a rotating machine according to claim 20 wherein the vibration frequency exclusion data defines vibration frequencies corresponding to a gear system.

23. The method of analyzing vibrations of a bearing installed in a rotating machine according to claim 1 further including the steps of:
   accessing additional vibration data corresponding to at least one additional bearing to be analyzed;
   determining a degraded condition factor BD from the additional vibration data for each additional bearing;
   selecting an expected designer-determined mean-time-to-failure MTTF for each additional bearing;
   selecting a forecast time period for each additional bearing;
   calculating a reduced mean-time-to-failure RMTTF for each additional bearing using the degraded condition factor BD for each additional bearing;
   calculating a probability of failure in the forecast time period for each additional bearing using the reduced mean-time-to-failure RMTTF for each additional bearing;
   searching for bearings having a probability of failure above a specified level; and
   displaying information about the bearings having a probability of failure above the specified level.

24. The method of analyzing vibrations of a bearing installed in a rotating machine according to claim 1 further including the steps of:
   accessing additional vibration data corresponding to at least one additional bearing to be analyzed;
   determining a degraded condition factor BD from the additional vibration data for each additional bearing;
   selecting an expected designer-determined mean-time-to-failure MTTF for each additional bearing;
   selecting a forecast time period for each additional bearing;
   calculating a reduced mean-time-to-failure RMTTF for each additional bearing using the degraded condition factor BD for each additional bearing;
   calculating a probability of failure in the forecast time period for each additional bearing using the reduced mean-time-to-failure RMTTF for each additional bearing;
   accessing cost data corresponding to a cost of failure of each additional bearing;
   calculating a financial risk for each additional bearing;
   searching for bearings having a financial risk above a specified value; and
   displaying information about the bearings having a financial risk above the specified value.

25. The method of analyzing vibrations of a bearing installed in a rotating machine according to claim 1 further including the steps of:
   accessing additional vibration data corresponding to at least one additional bearing to be analyzed;
   determining a degraded condition factor BD from the additional vibration data for each additional bearing;
   selecting an expected designer-determined mean-time-to-failure MTTF for each additional bearing;
   selecting a forecast time period for each additional bearing;
   calculating a reduced mean-time-to-failure RMTTF for each additional bearing using the degraded condition factor BD for each additional bearing;
   calculating a probability of failure in the forecast time period for each additional bearing using the reduced mean-time-to-failure RMTTF for each additional bearing;
   calculating an expected remaining bearing life for each bearing;
   searching for bearings having an expected remaining bearing life less than a specified duration; and
   displaying information about the bearings having an expected remaining bearing life less than the specified duration.

26. A computer program product for analyzing vibrations of a bearing installed in a rotating machine comprising:
   a computer usable medium having computer readable program code means embodied in said medium for accessing vibration data corresponding to the bearing to be analyzed;
   computer readable program code means for determining a degraded condition factor BD for the bearing from the vibration data;
   computer readable program code means for selecting an expected designer-determined mean-time-to-failure MTTF of the bearing operating under a design load in the operating environment of the rotating machine;
   computer readable program code means for selecting a forecast time period;
   computer readable program code means for calculating a reduced mean-time-to-failure RMTTF of the bearing using the expected designer-determined mean-time-to-failure MTTF and the degraded condition factor BD;
   computer readable program code means for calculating a probability of failure of the bearing in the forecast time period using the reduced mean time to failure RMTTF;
   computer readable program code means for accessing cost data corresponding to a cost of failure of the bearing in the rotating machine;
   computer readable program code means for calculating a financial risk from the calculated probability of failure in the forecast time period and the cost data; and
   computer readable program code means for displaying the financial risk for the selected time period.

* * * * *